United States Patent [19]
Finney

[11] Patent Number: 5,901,900
[45] Date of Patent: May 11, 1999

[54] THERMOCOUPLE ASSEMBLIES

[76] Inventor: Philip F. Finney, 425 E. Washington, Villa Park, Ill. 60181

[21] Appl. No.: 08/926,965

[22] Filed: Sep. 10, 1997

Related U.S. Application Data

[63] Continuation-in-part of application No. 08/134,645, Oct. 12, 1993, abandoned, and a continuation-in-part of application No. 08/304,141, Sep. 12, 1994, Pat. No. 5,711,608.

[51] Int. Cl.$^6$ .................................................. B23K 31/02
[52] U.S. Cl. ..................................... 228/173.5; 228/179.1
[58] Field of Search ............................. 228/173.1, 173.5, 228/227, 179.1

[56] References Cited

U.S. PATENT DOCUMENTS

| | | | |
|---|---|---|---|
| 2,757,220 | 7/1956 | Carter | 136/201 |
| 3,121,038 | 2/1964 | Perotte | 136/201 |
| 3,451,122 | 6/1969 | Kuhns et al. | 228/173.5 |
| 4,922,072 | 5/1990 | Topel et al. | 228/173.5 |
| 4,971,452 | 11/1990 | Finney | 374/208 |
| 5,141,335 | 8/1992 | Wannamaker et al. | 374/179 |

FOREIGN PATENT DOCUMENTS 957429  5/1964  United Kingdom ................... 374/179

*Primary Examiner*—Patrick Ryan
*Assistant Examiner*—Jeffrey T. Knapp
*Attorney, Agent, or Firm*—Patnaude & Videbeck

[57] ABSTRACT

A temperature sensing device includes a head piece having a solid metal body with a mounting surface and a recess within the mounting surface for receiving a thermocouple therein. The body has an attachment end, and hole extending through the attachment end which communicates with the recess such that a plurality of leads may extend through the hole and connect to the thermocouple. A thermocouple may be made by first removing the sheathing and insulation from the end of a thermocouple cable, exposing the leads and the leads are flattened or other wise shaped. Also the diameter of such cables can be reduced by subjecting them to a drawing process or a swedging process wherein the outer diameter of the sheath of the cable is reduced as is the diameters of the alloy leads within the cable. To maximize the accuracy of the thermocouple, the junction at the end of the cable can be turned 90 degrees and the junction positioned within the enclosure to abut against the surface, the temperature of which is to be measured.

3 Claims, 4 Drawing Sheets

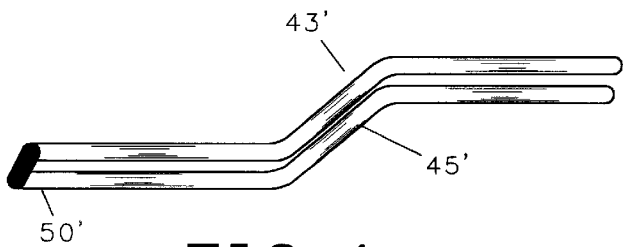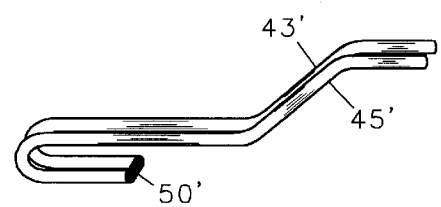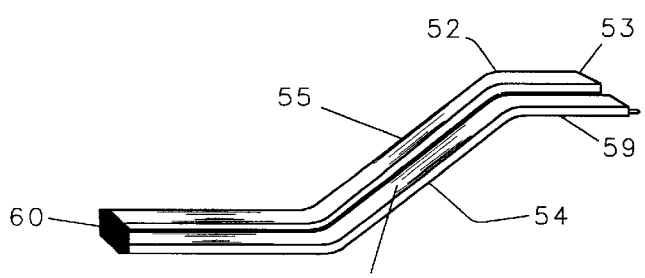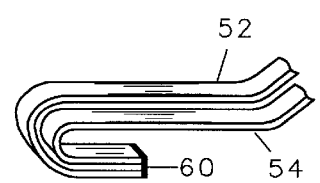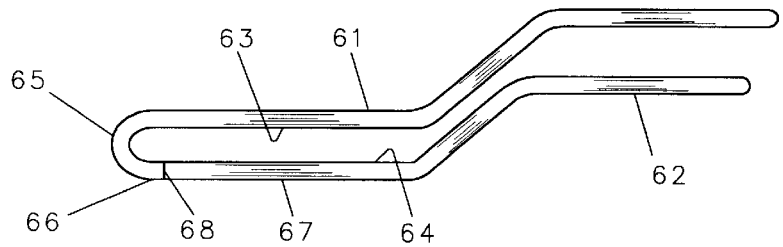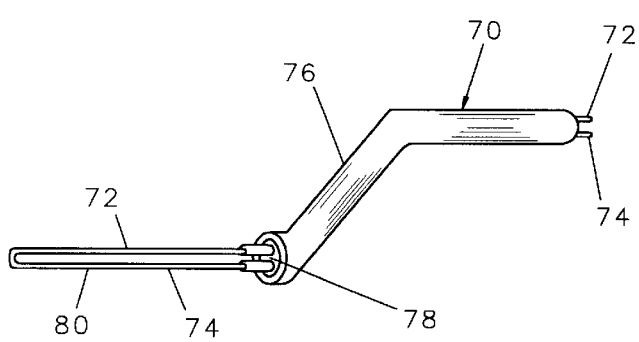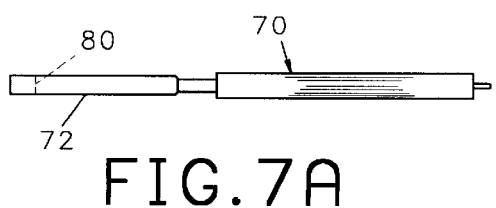

THERMOCOUPLE ASSEMBLIES

This application is a continuation-in-part of application Ser. No. 08/134,645 filed in the U.S. Patent Office on Oct. 12, 1993, now abandoned, and of Ser. No. 08/304,141 filed Sep. 12, 1994, now U.S. Pat. No. 5,711,608.

The present invention relates to thermocouples used to determine the temperatures of high-temperature surfaces, such as the temperatures found within a furnace or a heat exchanger.

BACKGROUND OF THE INVENTION

The present invention was disclosed to the Patent Office in a technical disclosure filed with the Patent Office on Oct. 18, 1990, and assigned number 265,544.

Certain heat exchangers and furnaces operate at extremely high temperatures, and the efficient operation of the heat exchanger or furnace often requires that certain portions of the apparatus operate within relatively narrow temperature ranges. The operation of such furnaces and heat exchangers, therefore, requires accurate monitoring of various surfaces within the exchanger or the furnace. Generally, the temperature of the surface to be measured is different from the temperature of the surrounding gases which may be used to heat the surface, or are in turn heated by the surface the temperature of which is to be measured. In any case, the device used to measure the temperature of a surface must be isolated so as to read the temperature of the surface, and not the temperature of the surrounding gases.

Where thermal energy is transmitted through gases to heat a surface, the isolating enclosure which protects the device from measuring the temperature of the surrounding gases also influences the temperature of the surface which is to be monitored. The area of the outer surface of the enclosure is greater than the area of the monitored surface which is covered by the enclosure for the temperature measuring device. The increased area of the enclosure causes what is known as a "fin effect" whereby a greater amount of energy is conducted from the enclosure to the monitored surface in the proximity of the measuring device. The fin effect is increased by the metal sheath which encloses the lead wires extending from the thermocouple. On the other hand, where a surface is being heated by radiant energy, the presence of an enclosure protecting a temperature measuring device will intercept radiant energy before it reaches the surface causing what is known as a "shadow effect" which results in the underlying surface being at a lower temperature than the surrounding surface. To minimize the temperature distortions caused by the fin effect and the shadow effect which is created by an enclosure, the enclosure of a temperature measuring device should be made as small as possible.

The leads extending to the thermocouple must be electrically insulated from the surrounding enclosure, but the electrical insulation surrounding the leads is also a thermal insulator. It is also desirable that thermal energy from the monitored surface be readily transferred to the thermocouple and, therefore, that there be a minimum of electrical insulation, or no electrical insulation between the thermocouple and the monitored surface.

Existing thermocouples used in high temperature heat exchangers are formed with the hot junction welded to and thermally connected to the sheath enclosure of a thermocouple cable. In such devices the thermocouple is spaced from the surface to which the device is attached. The accuracy of the thermocouple will be influenced by the spacing from the exchanger wall, and by heat which is conducted along the sheathing surrounding the cable.

In my prior Pat. No. 4,971,452, I disclosed the use of an RTD assembly for measuring the temperature of hot surfaces and enclosures for mounting such assemblies. Although RTD assemblies are useful for measuring the temperature of hot surfaces and the like, such RTD assemblies do not currently function at very high temperatures. Where surfaces are maintained at very high temperatures, it is desirable that the temperature measuring device applied to such surfaces be a thermocouple. Accordingly, there is a need for an improved thermocouple which minimizes the fin effect and shadow effect caused by the isolating housing used to mount the thermocouple against the monitored surface.

There is also a need to improve the accuracy of the temperature readings received from such thermocouples by reducing or eliminating thermal insulation between the thermocouple and the surface being monitored.

SUMMARY OF THE INVENTION

Briefly, the present invention is embodied in a temperature sensing device for use in monitoring the temperature of a surface. The device includes a head piece having a metal body with an elongate mounting portion and a recess within the mounting portion for receiving a thermocouple therein. The head piece has an attachment end, and a hole extending through the attachment end which communicates with the recess such that a plurality of leads may extend through the hole and connect to the thermocouple. The mounting portion also has a distal end remote from the attachment end, and the thermocouple is positioned within the recess near the distal end. An insulating material surrounds the leads and the conducting portions of the thermocouple so as to insulate them from each other and from the metal body of the enclosure.

In order for a thermocouple to provide maximum accuracy, the portion of the metal leads in the immediate vicinity of the junction should not be thermally insulated from the monitored surface. On the other hand, except for the immediate proximity of the thermocouple, the leads must be electrically insulated along their length. It would, therefore, be desirable to provide an insulation between the leads, and between the leads and the monitored surface which is a good electrical insulator but not a good thermal insulator. Generally, however, good electrical insulators are also good thermal insulators. To minimize the thermal insulating effect, the electrical insulating material should have a minimal thickness, and be able to withstand high temperatures.

Mica is an excellent electrical insulator which will endure high temperatures, and slivers or chips of mica can be sliced to a thickness of about 5 mils (5 thousandths of an inch). Such slivers of mica, however, should not be positioned between a thermocouple junction and the monitored surface because they will also provide an excessive amount of thermal insulation.

The conducting alloys which when joined together to form a thermocouple frequently include nickel or chromium. A nickel oxide or chromium oxide insulation can be formed on the surface of such alloy leads by baring the surfaces of the leads and exposing them to an oxidizing environment. One method of providing an oxidizing environment is to heat the leads to about 1,600 degrees Fahrenheit while exposed to air. At such temperatures, a portion of the nickel or chromium within the alloy is driven to the surface thereof and caused to oxidize, forming a coating which is a good electric insulator for use in a thermocouple.

This insulation is particularly desirable because the coating of metal oxide formed on the leads will have a thickness of about one-half mil, or about a tenth of the thickness of a sliver of mica. The thermal insulation of a metal oxide coating is, therefore, minimal. Some existing devices have used magnesium oxide or aluminum oxide powders to provide electrical insulation, however, a powdered insulation will not adhere to the surface of leads, and, therefore, powders are not suited for forming a very thin insulating layer.

An alternate embodiment for using a metal oxide insulator is to suspend small particles of the metal oxide in a slurry having a binder such as sodium silicate which is capable of withstanding temperatures, and applying the slurry to the surfaces of the leads using any appropriate method such as a brush. The treated surfaces would then be cured using any appropriate means such as heat. A similar procedure could be used to apply a mineral oxide insulation.

To minimize the fin effect, it is desirable that the portion of the head piece containing the thermocouple be made as small as possible. In my prior Pat. No. 4,971,452, I disclosed several configurations for head pieces which are usable with RTD devices. Although there are certain similarities between head pieces usable with RTD devices and those usable for thermocouples, the two devices have greatly different characteristics and the most desirable configuration of a head piece is different for a thermocouple than for a RTD assembly.

A RTD element has a certain length and it is desirable that there be no temperature gradient along the length of the device, and, therefore, a head piece shaped as shown in FIGS. 6, 7 and FIGS. 11, 12 of my prior Pat. No. 4,971,452 may be desirable. A thermocouple, on the other hand, is a planar junction between two dissimilar metals; it does not have a length. It is, however, desirable to minimize the temperature gradient across the interface between the two metals because the EMF of a thermo junction is a function of the average temperature across the junction.

A head piece having an elongate mounting portion and having one end which is adapted to be connected to a cable is, therefore, more suitable for mounting a thermocouple. Since it is desirable that the thermocouple accurately read the temperature of the surface against which it is positioned, the head piece should be configured to conduct heat from the connecting cable to the surface on which the device is mounted by a short and direct transfer path. The thermocouple is best positioned within the head piece near the distal end of the mounting portion, remote from the attachment with the connecting cable to thereby provide a long and indirect heat transfer path from the connecting cable.

Several structures for the leads may be used to form a thermocouple which can be fitted into a small enclosure. In one embodiment, a thermocouple is formed using thin strips of conducting material made of alloys suitable for forming a thermocouple. Each of the strips has opposing first and second surfaces and an end, and are positioned such that a portion of the first surfaces of the strips are coplanar and the ends of the strips are joined together. The metal strips are insulated along their length to prevent electrical contact of the strips except at their ends. When a thin strip of metal is positioned against a surface, there is very little temperature gradient between the upper and lower surfaces of the strip and as a result a thermocouple using such metal strips will provide more accurate readings of temperature.

Cables are currently available having an exterior sheathing which is insulated against high temperatures, and within the sheathing are leads made of alloys suitable for forming a thermocouple and surrounding the leads is an insulator. To form a thermocouple which has a minimal size, the leads of such cables may be utilized as the leads which are joined together to form a thermocouple. Such a thermocouple may be made by first removing the sheathing and insulation from the end of a thermocouple cable, exposing the leads. Next, the leads are flattened or otherwise shaped using any suitable means and then the leads are insulated from each other and the housing in which they are enclosed using the methods previously described.

The diameters of such cables which are currently available for attachment to thermocouples can be greatly reduced, and cables having a reduced diameter can be fitted within a small head piece which insulates the thermocouple from the environment. The diameter of such cables can be reduced by subjecting them to a drawing process or a swedging process wherein the outer diameter of the sheath of the cable is reduced as is the diameters of the alloy leads within the cable. Where the thermocouple is to be formed from a cable the diameter of which has been reduced, or otherwise shaped, only a small portion of the sheathing and insulation is removed adjacent the ends of the leads. The leads extending from one end of the cable are then welded together to form the thermocouple junction. To maximize the accuracy of the thermocouple, the junction at the end of the cable can be turned 90 degrees and the junction positioned within the enclosure to abut against the monitored surface. In another embodiment, the leads can be turned 180 degrees with the junction positioned between the cable and the monitored surface. The junction will thereby be subjected to a compressive force against the surface.

The leads which extend from a cable the diameter of which has been reduced may also be flattened or otherwise shaped and positioned within a small enclosure. Flattening of the leads will permit the thermocouple to be applied with the planar surfaces of the insulated leads against the monitored surface. Where the reduced cable leads have been flattened and positioned parallel to each other, the leads must be insulated from each other and the enclosure as previously described such that contact between the alloys is made only at the thermocouple junction.

Where a thermocouple is constructed as described above, the thermocouple can be made with a minimal size and can fit within a small enclosure which minimizes the fin effect and the shadow effect. A thermocouple is smaller than an RTD assembly, and a head piece for enclosing a thermocouple can be made smaller and may have a substantially different configuration of the mounting portion than a head piece for a RTD assembly.

Existing thermocouples for use in heat exchangers are not fitted with a head piece as in the present invention. Such existing thermocouples are enclosed within the distal end of the sheath of a thermocouple cable, or as shown in my earlier Pat. No. 3,939,554 and reissue Pat. No. R32,630.

The alloy of steel currently used to make the sheath of a thermocouple cable has greatly different properties from the alloy used within heat exchangers. The typical thermocouple sheathing is type 446 stainless steel (American Iron and Steel Institute AISI) whereas the steel used in heat exchangers is type 321 or type 347 (AISI) or type A336 T11 and A351 (American Society of Testing Materials ASTM).

The difference in these types of metal results in greatly different welding properties between them. The metal used in the sheathing of a thermocouple cable will have greater expansion during the welding process than will the metal of the heat exchanger, and as a result, a welding of the two different metals causes increased stress within the weld and the metals joined thereby. Stresses within the metal tubing of a heat exchanger can cause surface cracking of the metal, thereby allowing the products of combustion to enter and cause corrosion and deterioration thereof. The metals also differ in their receptiveness to receiving a weld, and these differences make the welding difficult to perform, a problem which is accentuated when a technician is required to make the weld in the confines of heat exchangers where the parts are caked with combustion residue and the like.

A head piece in accordance with the present invention should be made of a metal having the same or similar welding properties as the metal of the heat exchanger. That is, the welding properties of the head piece, including the coefficient of expansion and weld receptiveness, should be more similar to, or identical to, the welding properties of the metals of the heat exchanger and need not be similar to the welding properties of the metal sheathing. The weld joining the head piece to the end of a cable sheath will, therefore, be between metals having welding properties which are not so similar. However, this weld can be performed in the clean environment of the manufacturer of the thermocouple assembly where quality control is available. The on-site welding performed by an installer attaching the head piece to the heat exchanger will be simplified, in that it will not result in excessive internal stress forces within the metal of the surface to which the assembly is welded. Also, since the footprint of the head piece, as defined by the peripheral edge of the attachment portion contacting a surface of a heat exchanger, is substantially smaller than prior enclosures, a much smaller weld deposit can be used to attach the head piece to the wall of a heat exchanger. The smaller weld deposit reduces the overall mass of the thermocouple assembly on the surface without reducing the beneficial heat conducting qualities thereof. A smaller weld can be formed in a shorter period of time and can be done using a lower welding current, and the reduction of these factors will reduce the residual stresses within the metal and will reduce the severity of cracking within the surfaces thereof.

The stresses within the metal of the heat exchanger tubing can be further reduced by using a welding filler metal to join the head piece thereto which is more ductile than either the metal of the head piece or the metal of the heat exchanger tubing. Preferably, the welding material is high in nickel content, containing 60 percent or more nickel. I have found that welding filler manufactured by International Nickel Company and sold under the trademark INCONEL 82 is satisfactory for this purpose.

Other considerations affect the weld between the head piece and the sheath of the cable. Existing sheathing is typically made of A.S.I. Type 446 stainless steel and this material has an Austenitic condition where it is ductile and a Martensitic condition where it is brittle. The metal will convert from the Austenitic to the Martensitic condition as a result of being subjected to excessive heat over too long a period of time. Cracking and failure of the head piece or sheathing can occur where the metal is in the Martensitic condition because the metal is brittle and more prone to failure from loads imposed by the weight of the lead cable which is frequently unsupported near the headpiece. The head piece may be subjected to similar changes in condition, and it is desirable to undertake the welding of these two parts under controlled conditions where the metals of each are maintained in near Austenitic condition.

It should be appreciated that it would ultimately be desirable to provide a cable sheath which has welding properties which are similar to both the welding properties of the heat exchanger surface and the head piece, although such a sheath material is currently not available.

GENERAL DESCRIPTION OF THE DRAWINGS

The present invention may be better understood by a reading of the following detailed description taken in connection with the accompanying drawings wherein:

FIG. 4 is a isometric view of an alternate embodiment of the leads which would be fitted into a head piece shown in FIG. 1 and are joined to form a thermocouple;

FIG. 4A is an isometric view of a modification of the embodiment shown in FIG. 4;

FIG. 5 is an isometric view of another embodiment of the leads which may be fitted into the head piece shown in FIG. 1 and form a thermocouple;

FIG. 5A is a fragmentary isometric view of a modification of the embodiments shown in FIG. 5;

FIG. 6 is another embodiment of the leads which can be fitted into the head piece shown in FIG. 1 and form a thermocouple;

FIG. 7 is an isometric side view of a cable for which the diameter of the cable has been reduced, and the leads therein have been flattened and shaped to fit within an head piece such as shown in FIG. 1;

FIG. 7A is a top view of the embodiment shown in FIG. 7;

DETAILED DESCRIPTION OF PREFERRED EMBODIMENTS

Figure 1:
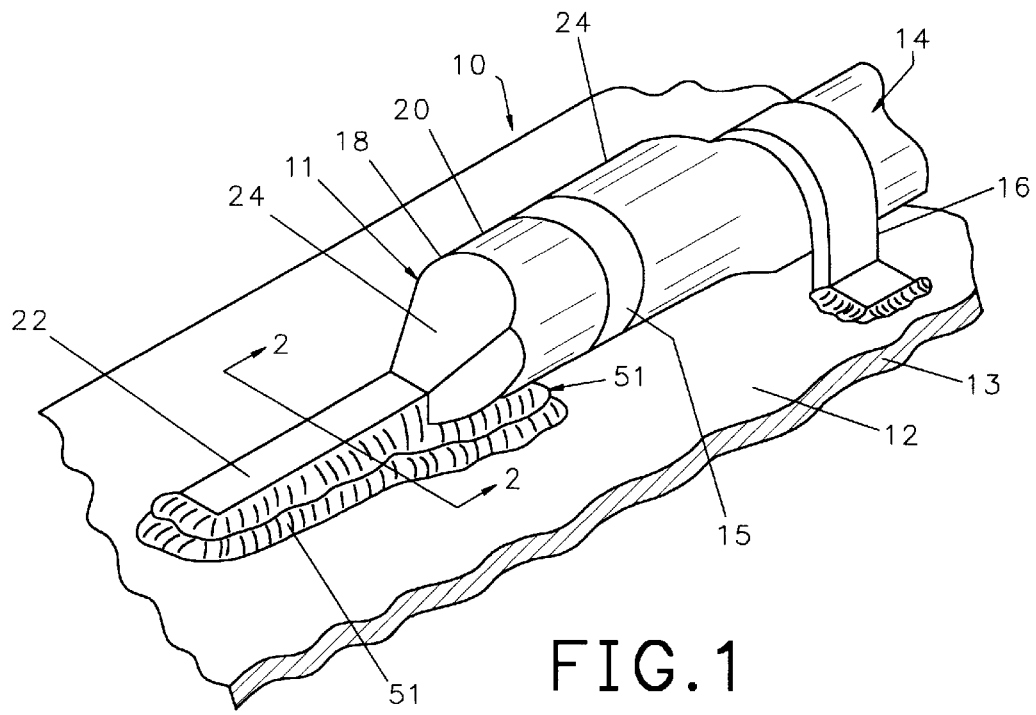
FIG. 1 is a fragmentary isometric view of a portion of a surface, the temperature of which is to be measured, a head piece for enclosing a thermocouple and a portion of a cable connected thereto.

Referring to FIG. 1, a thermocouple assembly 10 is welded to a surface 12 of a wall 13 the temperature of which is to be measured by the thermocouple assembly 10 having a head piece 11. The wall 13 may be in the form of a metal tubing through which hot gases or liquids pass thereby heating the monitored surface 12. The surface 12 might also be heated by radiant energy passing from the surrounding gases and striking the surface 12. The assembly 10 is welded directly to the external surface 12 of the wall 13 and a sheathed electric cable 14 is connected at its end to the rearward end of the head piece 11 and is retained in its desired orientation by a metal strap 16 welded at its ends to the surface 12.

Figure 2:
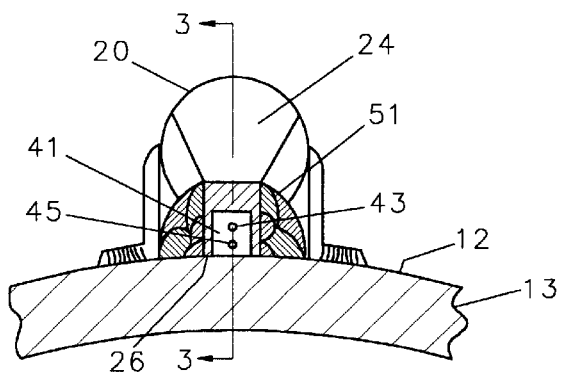
FIG. 2 is a cross-sectional view of the head piece shown in FIG. 1 taken through line 2—2 of FIG. 1.
Figure 3:
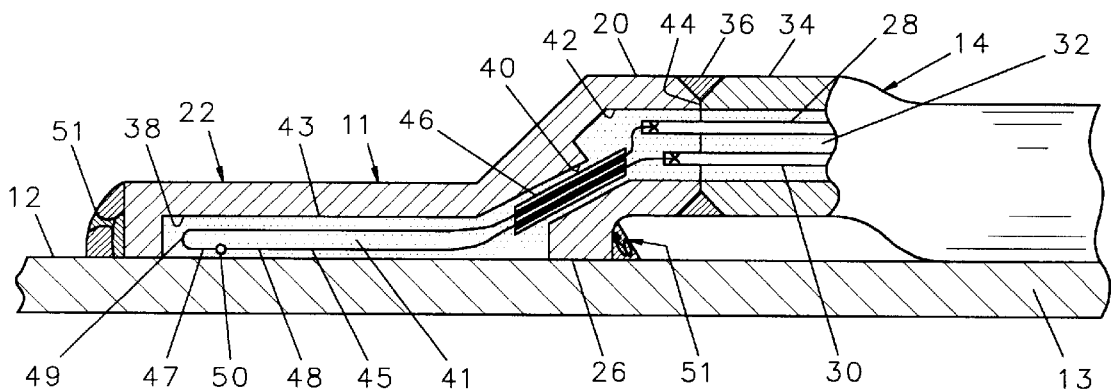
FIG. 3 is a cross-sectional view of the head piece and thermocouple shown in FIG. 1 taken through line 3—3 of FIG. 2.

As can be seen in FIGS. 1, 2, and 3, the head piece 11 has a body 18 with a cylindrical attachment end portion 20 at one end thereof adapted for attachment to the end of the cable 14 and an elongated mounting portion 22 having a rectangular cross section at the other end thereof adapted for attachment to the surface 12. Between the elongated mounting portion 22 and the cylindrical portion 20 is a tapered midsection 24 which is best shown in FIGS. 1 and 3. The attachment portion 20 is offset from the elongate mounting portion 22 such that the surface of the attachment portion 20 is spaced a small distance from the surface 12 when the mounting surface 26 thereof is positioned against the surface 12. As can be seen in FIG. 3, the cable 14 includes a pair of metallic alloy leads 28, 30 which are typically in a wire form and surrounding the leads is an insulation 32 which may be a magnesium oxide powder or another oxide. Surrounding the insulation 32 is a metal sheathing 34. The sheathing 34 of the cable 14 is attached to the attachment portion 20 of the head piece 11 by a weld 36.

As can be seen in FIGS. 2 and 3, the elongate mounting section 22 has a longitudinal groove 38 along the length of the mounting surface 26, and a hole extends through the tapered midsection 24 and forms a passage 40 from the groove 38 to an axial bore 42 in the attachment portion 20. As can be seen in FIG. 3, the leads 28, 30 extend outward from the distal end 44 of the cable 14 and are each welded to one end of fine wire leads 43, 45, respectively, which are fitted through an insulating sleeve 46 positioned in the passage 40. The other ends 47, 48 of the fine leads 43, 45 extend into the groove 38 and the distal ends thereof are welded to form a thermocouple junction 50. The insulating sleeve 46 may be made of ceramic material which is pre-formed or machined to the desired shape. One of the leads 43 has a 180 degree bend 49 in the length thereof so that at the junction 50, the leads are coplanar with the mounting surface 26 and will be adjacent to the surface 12. An insulating material 41 surrounds the leads 43, 45 and insulates the leads 43, 45, from each other and from the metallic head piece 11.

As can be seen in FIGS. 2 and 3, lead 45 and a portion of lead 43 are positioned near the surface 12 and are separated a small distance therefrom by insulating material 41. The insulating material 41 electrically insulates the leads 43 and 45 from the surface 12, and insulates the leads 43, 45 from each other such that electrical contact between these leads occurs only at the thermocouple 50. To accurately read the temperature of the surface 12, the insulating material 41 is best made as thin as possible to thereby minimize the thermal insulating effect of this barrier. Furthermore, to minimize the temperature gradient across the thermocouple junction, in the preferred embodiment the leads 43 and 45 are flattened, as previously described. Finally, the thermocouple junction 50 is fitted in the elongate mounting portion 22 near the distal end 53 thereof, distant from the attachment portion 20. As a result, heat collected in the cable 14 because of the fin effect will be dammed by the tapered midsection 24, and such heat which passes through the midsection 24 will be conducted into the surface 12 through the weld 51 near the attachment portion 20. Very little of the heat conducted down the cable 14 to the surface 12 will be directed along the length of the mounting portion 22 so as to alter the temperature of the surface 12 in proximity to the thermocouple 50. It is desirable that the thermocouple 50 be positioned near the distal end 53 of the mounting portion 22 such that it is spaced from the mounting portion 22 and the fin effect of the cable 14. It is also desirable that the mounting portion have a minimal cross sectional shape to minimize the fin effect and shadow effect in the proximity of the thermocouple, and have sufficient length to position the thermocouple 50 remote from the attachment portion 20. In the preferred embodiment, the mounting portion should have a cross sectional width of less than one-fourth inch, a cross sectional height of less than one-fourth inch and a length from the attachment portion 20 to the distal end 53 of at least four times the cross-sectional width thereof.

The thermocouple should be positioned in the head piece where the influence of the fin effect and shadow effect are minimized, which, as stated above, is toward the distal end 53. It should be noted, however, that there is a weld at the distal end 53 of the head piece and heat collected near the distal end will be conducted through that weld to the surface 12. The most desirable position for the thermocouple is at a point near the distal end 53, but not abutting the distal end.

It should be appreciated that the head piece can have any of a number of configurations. For example, the attachment portion 20 may be oriented to connect to a cable 14 which is perpendicular to the surface 12, but all such configurations should provide for an elongate mounting section such that the thermocouple 50 will be remote from the attachment portion 20.

The leads 43, 45 in FIGS. 2 and 3 are depicted with lead 45 near the surface 12 and lead 43 positioned away from the surface 12, except for the portion of the lead 43 between the bend 49 and the junction 50. FIG. 4 depicts an alternate embodiment wherein cylindrical leads 43' and 45' are positioned such that both leads and the junction 50' extend along the surface 12 in side-by-side relationship.

FIG. 4A depicts the cylindrical leads 43', 45' of FIG. 4 in side-by-side relationship with the distal ends thereof turned through a 180 degree curve to ensure that the junction 50' is applied against a surface such as surface 12 depicted in FIGS. 1, 2 and 3. The 180 degree curve will position the junction 50' below the insulating material in a head piece as depicted in FIG. 1, and the head piece with insulating material therein will compress the junction against the surface, the temperature of which is to be measured. In the configuration of FIG. 4a, the portion of leads 43' and 45' which are positioned below the insulating material will abut against the surface 12. Since only a short portion of leads 43' and 45' abut the surface, the junction 50' and the contact of the leads against the surface 12 will be isothermal and the thermocouple will accurately read the temperature of the surface 12.

As can be seen in FIG. 1, the head piece 11, with the leads 43, 45 therein is welded with a circumferential weld 51 to the surface 12 so as to hermetically seal the parts of the thermocouple from the surrounding gases. If oxygen or combustion gases enter the head piece 11, the leads 43, 45 and the insulating material 32 may undergo deleterious effects and cause damage to the thermocouple.

Existing thermocouples are formed at the end of a thermocouple sheath and such enclosures extend approximately one-half inch above the surface of the heat exchanger wall, and having a width of about one-half inch. The weld attaching the enclosure to the heat exchanger further increases the size of the enclosure. The elongated mounting section 22 of the head piece 11 can be made with a cross-sectional width of less than one-fourth inch and a height above the surface 12 of less than one-fourth inch. These dimensions are substantially less than the dimensions of existing enclosures and result in a reduction of the fin effect and the shadow effect previously described. Also, the head piece 11 can be made of a metal having welding properties which are similar to those of the surface 12.

The head piece and thermocouple should be made as small as possible, however, the walls of the head piece 11 are subject to erosion from corrosive gases of combustion. Corrosion is a function of time and temperature, and the mounting portion 22 of the head piece near the distal end 53 will be at a lower temperature than the sheath 34 of the cable 14, and the portion of the head piece which conducts heat from the sheath 34 to the surface 12. The thicknesses of the walls of the sheath 34 and of the head piece 11 should be chosen such that the associated parts should have substantially the same useful life. Therefore, the thickness of the head piece in the attachment portion, and in the mounting portion in the vicinity of the attachment portion should have a thickness substantially equal to the thickness of the attachment portion. The distal end 53 of the head piece 11, on the other hand, may have a lesser thickness than the other parts because it is maintained at a lower temperature.

A thermocouple is formed by the joining of two different alloys which generate an electromotive force (EMF) which has a known relationship to the temperature of the hot junction. As a result, each of the two leads which extend from the exterior of a chamber to the junction must be made of the same type of alloys which are welded together to form the junction. As shown in FIG. 3, the leads which extend into the head piece 11 of the assembly 10 may be either a portion of the leads 28, 30 which extend through the cable 14, or extension leads 43, 45 which are welded to the distal ends of leads 28, 30, respectively, in the cable 14. Where extension portions 43, 45 are welded to the ends of the leads 28, 30, each extension 43, 45 must be of the same alloy as used in the associated lead 28, 30 to which it is welded to avoid the formation of a second thermocouple.

Referring to FIG. 5 within a head piece, not shown, the leads 52, 54 may be in the form of thin strips of metal alloy with an electric insulator, not shown, between the strips and surrounding the strips to prevent the formation of secondary junctions by contact of the leads 52, 54 to the metal head piece, not shown. Such secondary junctions will decrease the accuracy of the device. As previously stated, the strips can be positioned near the surface 12 so as to minimize a temperature gradient across the width or height of the thermocouple. The insulating material must be suitable to withstand the high temperatures at which the thermocouple may be required to operate, and desirable insulators include mica, a ceramic material, or a metal oxide such as nickel or chromium oxide. Nickel oxide and chromium oxide are particularly desirable insulators because the alloys which make up the two leads of a thermocouple frequently incorporate nickel or chromium. If leads which incorporate nickel or chromium in the alloy are heated to high temperatures in an oxidizing atmosphere, some of the nickel or chromium in the alloy will be forced to the surface thereof and become oxidized. The nickel oxide and chromium oxide are particularly desirable as the insulator material 41 because they adhere readily to the surfaces of the leads and will resist cracking and breaking away from the surfaces of the lead. In the preferred embodiment, the leads are flattened and bent to the desired configuration prior to oxidizing the metal on the surface thereof to minimize spalling of the surface coat of insulation. Surfaces of adjacent leads which are flattened and which abut against each other should have the surfaces thereof oxidized prior to final assembling to minimize the bending of the leads.

Alternate methods of insulating the leads from each other may also be used. Ceramic material, such as a metal oxide or mineral oxide may be suspended in a binder and applied with a brush or other means to coat the leads and fill the spaces between them and cured by any appropriate means. Mica can also be formed into tubular sleeves and fitted over the ends of the leads 43, 45 and will provide a suitable insulating material 41, however, it also has thermal insulating qualities and in a preferred embodiment of a thermocouple using mica, the mica will not be positioned between the leads 43, 45 in the proximity of the thermocouple 50.

In the embodiment shown in FIG. 5, the leads are in the form of strips, strip 52 having first and second surfaces 53, 55, respectively, and strip 54 having first and second surfaces 57, 59, respectively. The first surfaces 53, 57 of the respective leads 52, 54 are positioned adjacent each other with insulating material 41 separating the leads. The distal ends of the leads are welded together to form a thermocouple junction 60. In FIG. 5A, the leads 52, 54 shown in FIG. 5 are curved 180 degrees to apply the junction 60 against the surface, the temperature of which is to be measured, similar to the structure of FIG. 4A previously discussed.

It is desirable that the thermocouple junction be positioned as near as possible to the surface, the temperature of which is to be measured to thereby maximize the accuracy of the temperature measuring device. Referring to FIG. 6, a first strip 61 and a second strip 62 of alloy comprise the leads of the thermocouple and the strips 61, 62 are again positioned with a first surface 63 of strip 61 adjacent the first surface 64 of strip 62. The strips 61, 62 are separated by an insulating material, not shown, similar to the insulating material described in connection with the embodiment depicted in FIG. 5. In this embodiment, however, one of the strips of alloy 61 has a bend 65 therein such that the second surfaces 66, 67 of the leads 61, 62, respectively, are positioned coplanar to one another with the distal ends of each of the strips 61, 62 abutting each other. The junction 68 is formed by a weld joining the abutting distal ends such that the junction 68 will abut against a surface, the temperature of which is to be measured, and will thereby accurately read the temperature of the surface.

Since the cable which extends from the thermocouple outside the furnace or heat exchanger has at least two wire leads made of different alloys joined together to form a thermocouple, the wires of the cable may be used to form the thermocouple. Referring to FIGS. 7 and 7A, a cable 70 has leads 72, 74 which extend therefrom. By removing a portion of the sheathing 76 and the insulating material 78, a portion of the leads 72, 74 can be exposed. The leads 72, 74 may be flattened and shaped into the configurations depicted in FIGS. 4, 5 and 6 above, and the wire of the leads may be fitted into the opening 40 and groove 38 of the head piece 11. The distal ends of the leads may then be welded together to form the thermocouple junction 80.

To reduce the diameter of the cable 70 and the wires which form the lead 72, 74, the cable 70 may be subjected to a drawing process or a swedging process, or a combination of both drawing and swedging, after which the diameter of the cable will be between 0.06 inch and 0.1 inch. The cable 70 with a reduced diameter can then be fitted through the passage 40 extending from the bore 42 to the groove 38 in the head piece 11, and will not require an insulating sleeve 46, as previously described.

Figure 8:
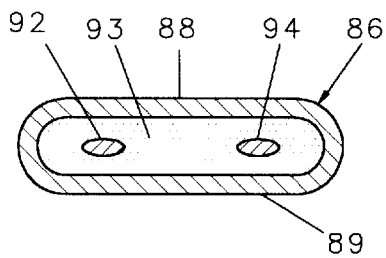
FIG. 8 is an enlarged cross sectional view of the distal end of another cable the diameter of which has been reduced.

Referring to FIG. 8, the swedging and drawing process used to alter and reduce the cross sectional shape of a cable 86 can be used to form a somewhat oval cross sectional shape having somewhat planar surfaces 88, 89. In this embodiment, the cable 86 is oriented such that after the swedging and drawing process, the leads 92, 94 which form a junction 90 will be parallel to one another and will have a generally elliptical cross sectional shape, and the leads are surrounded by an insulation 93.

Figure 9:
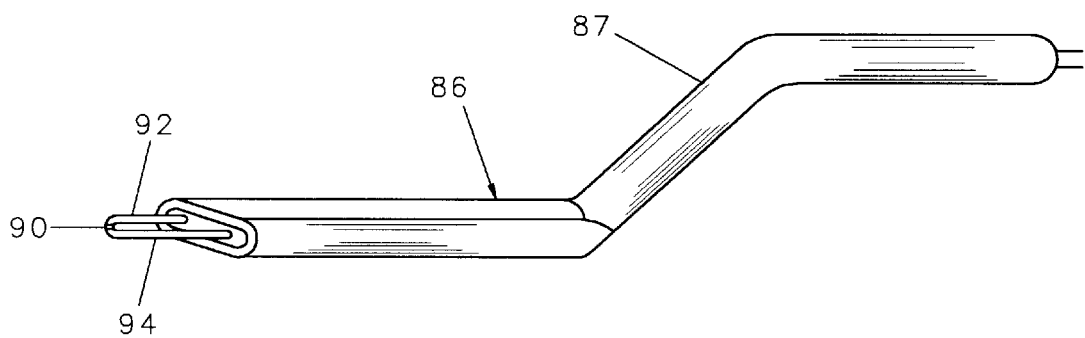
FIG. 9 is an isometric view of the cable of FIG. 8 which has been configured for insertion in the head piece shown in FIG. 1.
Figure 9A:
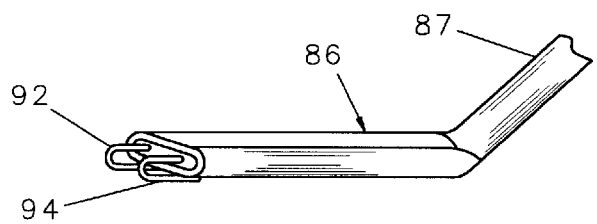
FIG. 9A is a fragmentary isometric view of a modification of the embodiment shown in FIG. 9.

As can be seen in FIG. 9, the cable 86 can be configured to fit through the passage 40 in the head piece 11. Referring to FIG. 9A, the junction 90 is applied against a surface, the temperature of which is to be measured, by 180 degree turns in leads 92, 94, respectively, such that the junction 90 is positioned between the sheath 88 and the surface, the temperature of which is to be measured. When a cable 86 as depicted in FIG. 9A is fitted into a head piece 11, the distal ends of the leads 92, 94 and the junction should protrude a small distance beyond the plane of the mounting surface 26 of the head piece 11. Thereafter, the head piece 11 can be clamped to a surface 12 while a weld 51 is applied, and the insulating material 93 within the cable 86 will be compressed as the leads 92, 94 and junction 90 are forced into the cavity 38 of the head piece 11.

Figure 10:
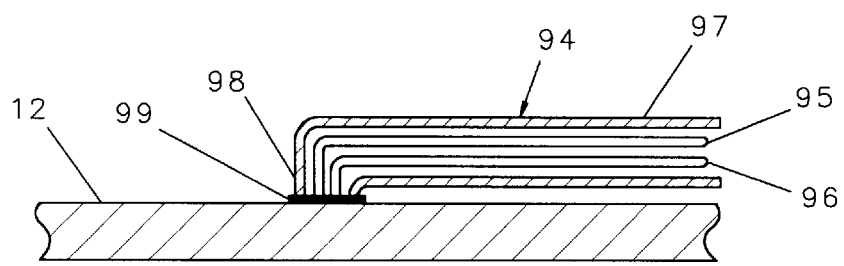
FIG. 10 is a cross-sectional view of another embodiment of a cable configured for insertion into a head piece such as shown in FIGS. 1, 2 and 3.

FIG. 10 depicts another embodiment of a thermocouple constructed from a cable 94 having alloy leads 95 and 96 and an outer sheath 97 and which has been subjected to a swedging and drawing process such as described with respect to FIGS. 8 and 9. In this embodiment, the distal end 98 of the cable 94, which is fitted in a head piece, is turned 90 degrees such that the junction 99 can be compressed against a surface 12 the temperature of which is to be measured, and thereby maximize the accuracy of the thermocouple. In this embodiment, the junction 99 is formed by a weld which joins the ends of the leads 95, 96 and also the sheath 97.

Figure 11:
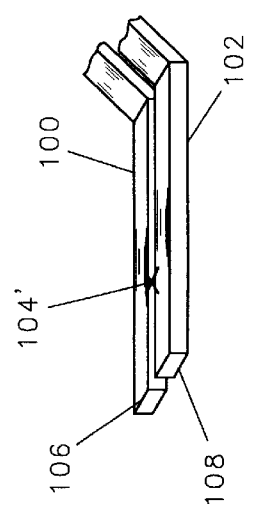
FIG. 11 is an isometric view of a thermocouple formed by leads in the shape of strips positioned in side-by-side relationship.

Referring to FIG. 11, leads 102, 102 which may be configured as strips as shown, or may have any other cross-sectional shape, can also be oriented in side by side relationship with the edges of the strips adjacent one another and a junction 104 formed between them. The junction 104 may be positioned anywhere along the length of parallel leads, however, the portion of the leads 100, 102 from the junction 104 to the distal ends 106, 108 thereof, respectively, does not affect the thermocouple. Nevertheless, these distal ends 106, 108 must be insulated against contact with the metal head piece into which the thermocouple is fitted.

Figure 12:
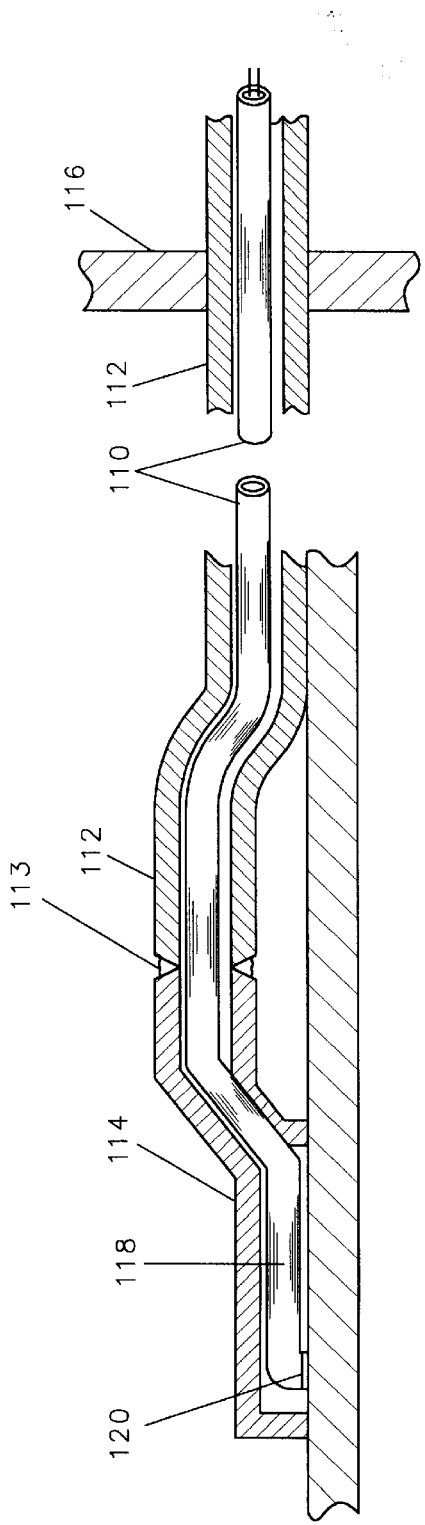
FIG. 12 is a cross-sectional view of another embodiment of a thermocouple in accordance with the present invention which is similar to that shown in FIG. 10, except that an extended piece of sheathed cable is used.

Referring to FIG. 12, a long portion of cable 110 which has been drawn or swedged may also be fitted through a metallic tubing 112 which is attached by a weld 113 to the head piece 114. The cable 110 extends from the head piece 114 through the tubing 112 to a point outside the wall 116. In this embodiment, one end 118 of the cable 110 is fitted into the head piece 114 and the leads of the cable 110 are joined at their distal end by a weld 120 as shown in FIG. 10 to form the junction.

Figure 13:
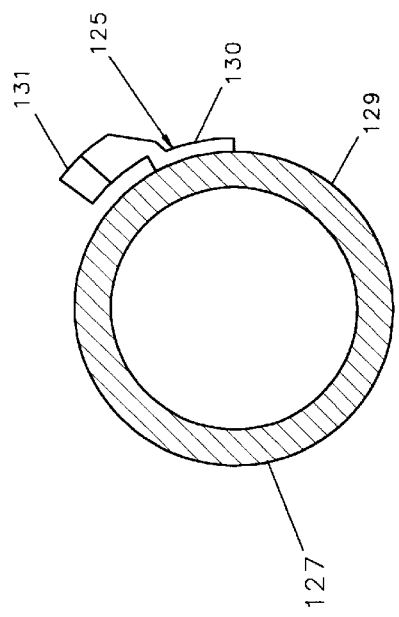
FIG. 13 is a cross-sectional view of a tube to which a head piece for a thermocouple has been attached which extends transverse to the length of the tube.

Finally, referring to FIG. 13, a thermocouple can be mounted in a head piece 125, which is positioned substantially transverse to the length of a tubing 127 the outer surface 129 of which is to be monitored. In this embodiment, the mounting portion 130 of the head piece has an arcuate mounting surface to conform to the curve of the surface 129. The cable 132 extends from the attachment end 134 and may be secured against movement by a clamp, not shown, which may attach to the tube 127, or any other object within the furnace. A thermocouple can be inserted with a transverse mounting as shown in FIG. 13 because the leads can be curved as needed to conform to the shape of the enclosure and apply the junction against the monitored surface. This mounting is not suitable for usage with an RTD, however, because an RTD element is cylindrical, has a length of approximately one inch, a diameter of approximately one-eighth inch, and is very frangible. Any attempt to bend it to conform to a curved surface will result in the failure of the element.

There has, therefore, been disclosed an improved head piece for enclosing a thermocouple, improved methods of insulating the leads of the thermocouple, and improved configurations for the leads and the junction.

While the present invention has been described in connection with particular embodiments, it will be understood by those skilled in the art that many changes and modifications may be made without departing from the true spirit and scope of the present invention. Therefore, it is intended by the appended claims to cover all such changes and modifications which come within the true spirit and scope of the invention.

What is claimed:

1. A method of forming a temperature sensing device for measuring the temperature of a surface within a chamber having an outer wall comprising the steps of:

providing a head piece having an attachment portion for attachment to a metal tubing and a mounting portion for mounting on said surface, providing a length of thermocouple cable having pair of alloy leads and a metallic sheathing, reducing the cross-sectional area of said cable, providing a length of metal tubing extending from near said surface through said outer wall, attaching one end of said tubing to said attachment portion of said head piece, inserting a first end of said cable into said tubing until said first end extends into said head piece, and joining said leads at said first end of said cable to form a thermocouple junction, and welding said mounting portion to said surface.

2. A method of forming a temperature sensing device comprising the steps of:

providing a head piece having a cavity therein, providing a length of thermocouple cable having an end and a pair of alloy leads with insulation surrounding said leads and a metallic sheathing around said insulation, extending the length of said cable and thereby reducing the outer diameter of said cable and said alloy leads, inserting said cable into said head piece with said end in said cavity, removing a portion of said insulating material and said sheathing from said end of said cable exposing an end of each said leads, joining said ends of said leads at said end of said cable to form a thermocouple junction, turning said ends of said leads 90 degrees to position said junction coplanar with a mounting surface of said head piece, and welding said junction and said metallic sheathing to said surface.

3. A method of forming a temperature sensing device comprising the steps of:

providing a head piece having a cavity therein, providing a length of thermocouple cable having an end and a pair of alloy leads with insulation surrounding said leads and a metallic sheathing around said insulation, extending the length of said cable and thereby reducing the outer diameter of said cable and said alloy leads, inserting said cable into said head piece with said end in said cavity, removing a portion of said insulating material and said sheathing from said end of said cable exposing an end of each of said leads, joining said ends of said leads at said end of said cable to form a thermocouple junction, turning said ends of said leads 180 degrees to position said junction between said cable and a surface against which said head piece is to be mounted, and compressing said junction against said surface against which said head piece is to be mounted, and welding said head piece to said surface.

* * * * *